April 6, 1926.  1,579,408
G. A. SMITH ET AL
DETACHABLE CULTIVATING TOOL
Filed July 25, 1924
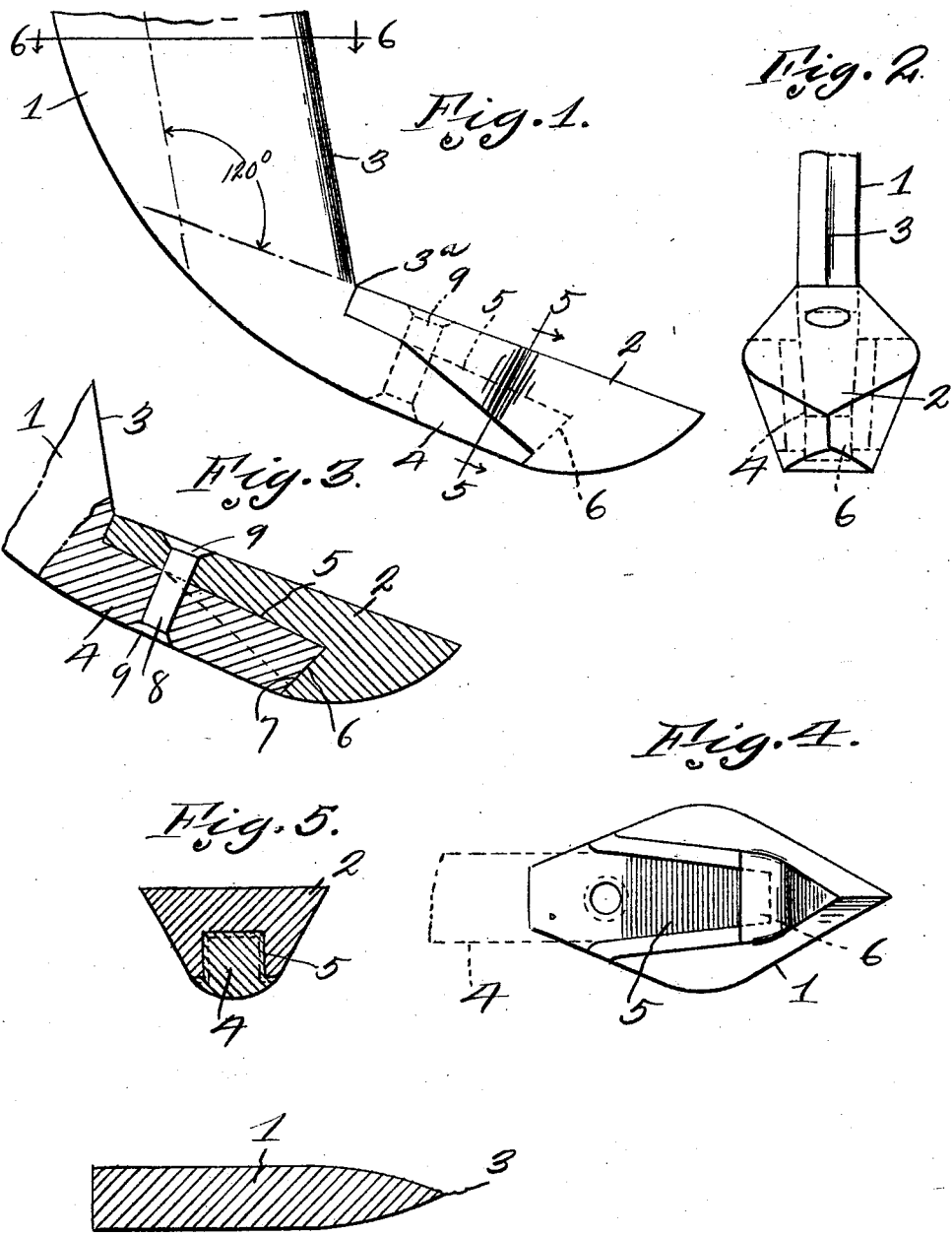
Inventors
George H. Smith and
John F. Sincock
By Philip A. H. Serrell
Attorney Patented Apr. 6, 1926.

1,579,408

UNITED STATES PATENT OFFICE.

GEORGE A. SMITH AND JOHN F. SINCOCK, OF SEDGWICK, COLORADO.

DETACHABLE CULTIVATING TOOL.

Application filed July 25, 1924. Serial No. 728,119.

*To all whom it may concern:*

Be it known that GEORGE A. SMITH and JOHN F. SINCOCK, citizens of the United States, residing at Sedgwick, in the county of Sedgwick and State of Colorado, have invented certain new and useful Improvements in Detachable Cultivating Tools, of which the following is a specification, reference being had therein to the accompanying drawings.

The invention relates to detachable points for cultivator arms of any type of cultivator, and has for its object to provide a device of this character, which may be easily and quickly attached to a cultivator arm and positively held thereon at an angle whereby a deep or shallow tilling action may take place, and the point constructed in a manner whereby it will easily penetrate the ground without turning the same, and at the same time constructed in a manner whereby a minimum amount of disturbance will take place at the surface of the ground, thereby conserving the moisture within the ground.

A further object is to provide the front side of the cultivator arm with a sharp edge, thereby reducing the friction to a minimum as said arm moves through the ground and at the same time providing a substantially complete closing of the top soil to prevent escape of the moisture and the detachable point thoroughly stirring the soil below the surface without throwing dirt upon small plants.

A further object is to provide the lower end of the cultivator arm with a downwardly and forwardly inclined arm substantially rectangular shaped in transverse cross section and tapering, and the underside of the detachable cultivator point with a tapered recess in which said arm is received and held firmly by a rivet extending through the cultivator point in the forwardly extending arm.

A further object is to provide acutely disposed walls carried by the cultivator arm extension, and the inner end of the recess of the point, which walls engage each other and prevent upward movement of the detachable point and consequent strain on the securing rivet.

A further object is to provide a detachable diamond point for a cultivator arm which may be cheaply constructed and when worn or broken may be removed, discarded and replaced with a new point.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the cultivator arm showing the detachable point carried thereby.

Figure 2 is a front elevation of the cultivator arm and point.

Figure 3 is a vertical longitudinal sectional view through a portion of the cultivator arm and the point.

Figure 4 is a bottom plan view of the point.

Figure 5 is a vertical transverse cross section taken on line 5—5 of Figure 1.

Figure 6 is a horizontal sectional view through the cultivator arm taken on line 6—6 of Figure 1.

Referring to the drawing the numeral 1 designates the cultivator arm, which may be attached to any kind of an agricultural implement, preferably of standard makes, for instance beet cultivators, sub-soilers, corn listers and other tool cultivators for deep or shallow tilling, and 2 the detachable point carried thereby. The forward side of the cultivator arm 1 is sharpened as at 3, therefore it will be seen that when the arm is forced through the ground, the friction will be reduced to a minimum, and at the same time the top soil will be severed in a manner whereby there will be a minimum of disturbance of the top soil, thereby insuring the maintenance of the moisture within the ground, and at the same time preventing the throwing or turning of soil onto small plants, which is a common difficulty with cultivators as at present constructed. The lower end of the arm 1 terminates in an integral forwardly and downwardly extending extension arm 4, which extension arm tapers in width towards its end and is disposed in tapered recess 5 in the under side of the detachable point 2, therefore it will be seen that a tight jamming connection is formed between the extension arm 4 and the detachable point 2 for positively preventing side play of the point, as the same moves through the soil, which is particularly desirable where the soil is of a nature which is difficult to penetrate. The forward wall 6 of the recess 5 is acutely disposed in relation to the bottom wall thereof and the forward end 7 of the extension arm 4 is acutely angled at a corresponding angle to the wall 6, therefore it will be seen that when the point 2 is on the extension arm, and secured thereon by means of the rivet 8, said point will be positively held against being forced upwardly at its outer end, consequently strain is relieved from the securing rivet 8, therefore play can not develop. Rivet 8 is provided with countersunk heads 9, which are flush with the upper side of the point 2, and the under side of the extension member 4, therefore plants, roots and the like can not catch on the rivet heads and clog the plow, but may move rearwardly where they will be severed by the sharpened edge 3. It will be noted that the point 2 inclines downwardly and forwardly at an angle where the machine, on which the device is mounted, will be positively held to the ground, and it has been found that by disposing the point at substantially 120 degrees to arm 2, the best results are obtained with the minimum amount of friction. It will be noted that the lower corner 3ᵃ of the sharpened edge 3 terminates in registration with the upper side of the point 2, therefore it will be seen that roots will be positively guided into engagement with the sharp edge and be severed, and that the point 2 is shaped for a "diamond point".

The point 2 may be made from any suitable metal however for purposes of maximum efficiency, strength and cheapness of construction it may be molded of cast iron, cast steel, or may be a drop forging suitable to stand the hard wear of heavy or stony soils, and to tear up the packed soil and the angle of the arm 1 and the point preventing the minimum friction and giving the device a maximum strength.

From the above it will be seen that a detachable cultivator point is provided, which may be easily and quickly applied to a cultivator arm, positively and detachably held thereon, and one which will thoroughly till the soil upon deep or shallow tilling without throwing dirt onto the plants and with the minimum movement of the upper soil, and one which when worn may be discarded and replaced with a new point at a minimum cost.

The invention having been set forth what is claimed as new and useful is:—

The combination with a cultivator arm, of a forwardly and downwardly extending arm carried thereby, a detachable point carried by the forwardly and downwardly extending arm, said forwardly and downwardly extending arm being disposed in a recess in the underside of the point and having a tapering engagement with said recess in vertical planes and with the bottom of the recess in a downwardly and forwardly inclined plane, a rivet extending through the point and the forwardly and downwardly extending arm, said point having the forward wall of its recess acutely angled, the forward end of the forwardly and downwardly extending arm being acutely angled and engaging the acutely angled wall of the point and preventing upward movement of the forward end of the point, said cultivator arm having its forward edge sharpened, the lower end of said sharpened forward edge terminating in registration with the upper side of the point.

In testimony whereof we hereunto affix our signatures.

GEORGE A. SMITH.
JOHN F. SINCOCK.